US012512310B2

(12) United States Patent
McHugh et al.

(10) Patent No.: US 12,512,310 B2
(45) Date of Patent: Dec. 30, 2025

(54) POROUS MATERIALS FOR ENHANCED IONIZATION EFFICIENCY

(71) Applicant: Battelle Memorial Institute, Richland, WA (US)

(72) Inventors: Kelly McHugh, Richland, WA (US); Michael Sinnwell, Iowa City, IA (US); Dushyant Barpaga, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 937 days.

(21) Appl. No.: 17/716,297

(22) Filed: Apr. 8, 2022

(65) Prior Publication Data

US 2022/0336200 A1 Oct. 20, 2022

Related U.S. Application Data

(60) Provisional application No. 63/172,789, filed on Apr. 9, 2021.

(51) Int. Cl.
*H01J 49/16* (2006.01)

(52) U.S. Cl.
CPC .................................... *H01J 49/16* (2013.01)

(58) Field of Classification Search
None
See application file for complete search history.

(56) References Cited

PUBLICATIONS

Baruzzini et al., "Enhanced ionization efficiency in TIMS analyses of plutonium and americium using porous ion emitters," *International Journal of Mass Spectrometry*, Jan. 2017, 412:8-13; manuscript accepted Nov. 18, 2016, 18 pages.

Deng et al., "Construction of a Stable Ru—Re Hybrid System Based on Multifunctional MOF-253 for Efficient Photocatalytic $CO_2$ Reduction," *Inorganic Chemistry* 57(14):8276-8286, Jul. 2, 2018.

Feng et al., "The Chemistry of Multi-component and Hierarchical Framework Compounds," *Chemical Society Reviews*, 48:4823-4853, Sep. 21, 2019.

Stanley et al., "Investigating enhanced thorium ionization in TIMS using Re/Pt porous ion emitters," *Journal of Radioanalytical and Nuclear Chemistry* 299:1447-1452, 2014, published Nov. 5, 2013.

*Primary Examiner* — Xiaoyun R Xu
(74) *Attorney, Agent, or Firm* — Klarquist Sparkman, LLP

(57) ABSTRACT

Nanoporous ion emitters (nano-PIEs) materials promote ionization efficiency of an analyte during thermal ionization mass spectrometry (TIMS). The nano-PIE is a hierarchical material or a modified hierarchical material. The nano-PIE may comprise a coordination polymer (CP), a modified CP, or any combination thereof. Ionization efficiency is promoted by loading the nano-PIE and an analyte on a TIMS filament for subsequent TIMS analysis.

18 Claims, 7 Drawing Sheets

3x10^5
2x10^5
1x10^5
0
144Nd (cps)

1700
1600
1500
1400
1300
1200
Temperature (°C)

3000
2800
2600
2400
2200
2000
Filament Current (mA)

0
2000
4000
6000
8000
Elapsed Time (sec)
Phosphoric acid
MOF-253
Re-MOF-253

POROUS MATERIALS FOR ENHANCED IONIZATION EFFICIENCY

CROSS REFERENCE TO RELATED APPLICATION

This application claims the benefit of the earlier filing date of U.S. Provisional Application 63/172,789, filed Apr. 9, 2021, which is incorporated by reference in its entirety herein.

ACKNOWLEDGMENT OF GOVERNMENT SUPPORT

This invention was made with Government support under Contract DE-AC0576RL01830 awarded by the U.S. Department of Energy. The Government has certain rights in the invention.

FIELD

Methods for using a nanoporous ion emitter (nano-PIE) to enhance ionization efficiency of an analyte during thermal ionization mass spectrometry (TIMS) are disclosed.

SUMMARY

Embodiments of a method to prepare an analyte for thermal ionization mass spectrometry (TIMS) analysis are disclosed. In some embodiments, the method includes loading a nanoporous ion emitter (nano-PIE) and an analyte on a filament to create a loaded filament. In some embodiments, a mass ratio of the nano-PIE to the analyte is from $10^{15}$:1 to 10:1. In some embodiments, a mass of the analyte is from 1 attogram to 1 microgram. Advantageously, the nano-PIE may enhance ionization efficiency of the analyte during TIMS analysis.

The nano-PIE is a hierarchical material, a modified hierarchical material, or a combination thereof. In any or all of the foregoing or following embodiments, the nano-PIE may comprise a single crystal, a polycrystalline material, a self-assembled monolayer, a modified nanoporous material, or any combination thereof. In some embodiments, the nano-PIE comprises a metal or metalloid and a coordinating organic component.

In any of the foregoing or following embodiments, the nano-PIE may comprise a coordination polymer (CP), a modified CP, or any combination thereof. In some embodiments, the modified CP is obtained by combining a CP with a sorbent, combining a CP with a metal nanoparticle, thermal treatment, chemical treatment, or any combination thereof.

In some embodiments, the CP is a metal organic framework (MOF) and/or the modified CP is a modified MOF. In certain embodiments, the MOF or modified MOF comprises MOF-253, M-MOF-74 (M is Ni, Mg, Mn, Co, Zn, or any combination thereof), MIL-101, UiO-66, ZIF-67, or any combination thereof.

In any or all of the foregoing or following embodiments, the CP or the modified CP may have (i) an average pore diameter of from greater than 0 to 100 Å; or (ii) a pore volume of from greater than 0 to 5 $cm^3/g$; or (iii) a BET surface area of from greater than 0 to 8000 $m^2/g$; or (iv) an average crystallite size of from greater than 0 to 500 μm; or (v) any combination of (i)-(iv).

In any or all of the foregoing or following embodiments, loading the nano-PIE on the filament may comprise crystallizing the nano-PIE from a solution on the filament, coating the nano-PIE on the filament, printing the nano-PIE on the filament using 3D printing, or depositing a suspension comprising the nano-PIE on the filament. In some embodiments, the filament comprises Re, Ta, W, Pt, or Ir. In some implementations, the analyte comprises an actinide, a lanthanide, a platinum group element, Cs, or iodine.

In any or all of the foregoing or following embodiments, the method may further comprise preparing the loaded filament for analysis by TIMS. In some embodiments, preparing the loaded filament for analysis by TIMS comprises drying the nano-PIE and analyte on the loaded filament, applying a vacuum to the loaded filament to provide a treatment pressure less than atmospheric pressure, and applying a treatment current to the loaded filament under the treatment pressure for a time of from 0 to 60 minutes to make a treated filament. In some embodiments, preparing the loaded filament further comprises adding a carbon-based or nitrogen-based atmosphere while applying the treatment current to the loaded filament under the treatment pressure. In some embodiments, the filament is treated under a pressure of from $3\times10^{-5}$ mbar to 0.1 mbar, the treatment current is from 0.1 A and 5 A applied at a rate of from 0.01 A/min to 0.1 A/min.

In some embodiments, the method further comprises conducting an analysis of the analyte by TIMS.

Embodiments of a kit include a filament suitable for TIMS and a quantity of a nano-PIE as disclosed herein. In some embodiments, the nano-PIE comprises a CP, a modified CP, or any combination thereof. In certain embodiments, the CP is a MOF and/or the modified CP is a modified MOF.

The foregoing and other objects, features, and advantages of the invention will become more apparent from the following detailed description, which proceeds with reference to the accompanying figures.

BRIEF DESCRIPTION OF THE DRAWINGS

FIG. 7A shows $^{144}$Nd signal (cps) over elapsed time, FIG. 7B shows temperature (° C.) over elapsed time, and FIG. 7C shows filament current (mA) over elapsed time.

DETAILED DESCRIPTION

Figure 1:
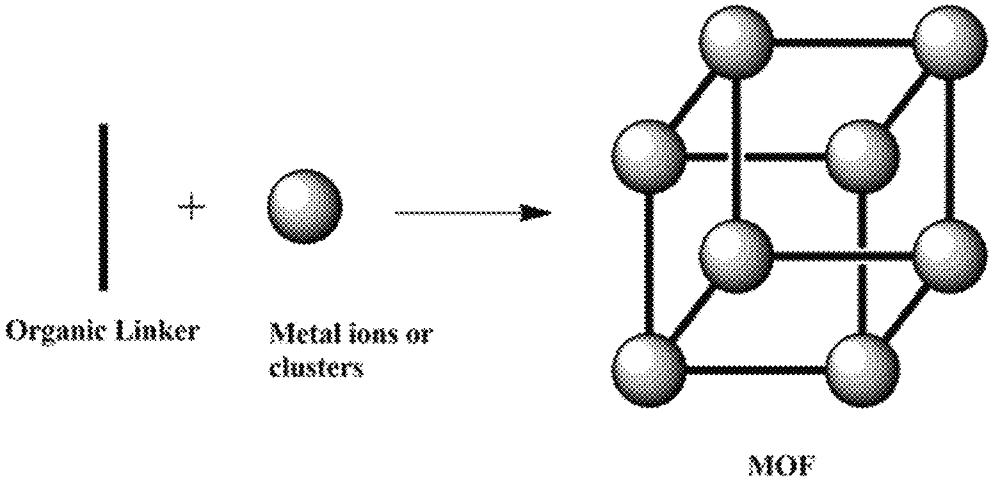
FIG. 1 is a modular representation of a metal organic framework (MOF).

This disclosure concerns embodiments of methods for using a nanoporous ion emitter (nano-PIE) during thermal ionization mass spectrometry (TIMS) analysis, as well as embodiments of suitable nano-PIEs. Advantageously, the nano-PIE may enhance ionization efficiency of an analyte during TIMS analysis. Embodiments of a kit comprising a filament suitable for TIMS and a quantity of a nano-PIE also are disclosed.

TIMS is considered the "gold standard" for isotopic analysis of environmentally and/or strategically important materials. In contrast to plasma methods, the thermal dependence of evaporation and ionization makes TIMS element-selective and avoids molecular interference issues inherent with plasma-based mass spectrometry methods—critical factors when analyzing sub-picogram samples deposited in the environment or collected for treaty verification. However, low ionization efficiencies (<0.1% for actinides) by traditional TIMS sample preparation methods (e.g., solution loading on a flat filament) have inhibited the broad utility of this technique.

Alternative methods to traditional sample preparation have been developed to increase ionization to 1-5%. In one method, resin beads are sorbed with sample, loaded on a filament, and carburized with benzene gas. In another method, a porous ion emitter—a non-hierarchical macroporous structure created out of platinum-rhenium metal powders bound by organic gluing agents, carburized with benzene gas, and loaded with cation-exchanging polymers—is believed to enhance ionization by increasing the surface area from which ions are emitted. Difficulties remain, however, as both methods are inherently time consuming, require high skill-levels for analysis and sample preparation, and constrain sample sizes and detection limits.

These problems can be overcome by utilizing nano-PIEs in TIMS analysis. The nano-PIEs comprise a hierarchical material, a modified hierarchical material, or a combination thereof. The inherent synthetic and chemical tunability (e.g., customizable pore sizes and targeted sorption behaviors) of nano-PIEs presents the opportunity to design materials and approaches to simplify sample loading and/or improve ionization efficiencies.

The use of hierarchical materials in TIMS remains unexplored. Materials used to make nano-PIEs are typically used for absorption and retention rather than release or analytical applications. Therefore, it was surprising that a nano-PIE could facilitate ionization of an entrapped analyte. Also, some nano-PIEs lack one or more characteristics of materials typically thought of to improve thermal ionization, such as being composed of high purity materials, made with high work function metals, thermally stable above 1000° C., and/or structurally and chemically stable in acid environments. Another hurdle to overcome was size; nano-PIEs are composed of small particle sizes which are easily dispersible and challenging to adhere to a TIMS filament. Embodiments of the disclosed nano-PIEs overcome one or more of these difficulties and may increase ionization efficiency of analytes during TIMS analysis.

Embodiments of the disclosed nano-PIEs may have one or more of the following advantages which may improve ionization efficiency: (1) nano-PIE materials have greater porosity than prior porous ion emitters and can be synthetically modified; and/or (2) nano-PIE materials can be designed to adsorb a specific element. In some embodiments, these engineered materials also are simpler to use than prior materials for TIMS analysis.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Actinide: Any of the series of fifteen metallic elements from actinium (atomic number 89) to lawrencium (atomic number 103) in the periodic table.

Alkali metal: Alkali metal refers to lithium (Li), sodium (Na), potassium (K), rubidium (Rb), cesium (Cs), and francium (Fr).

Analyte: As used herein, the term "analyte" refers to an element that is being identified and/or quantified using TIMS.

BET surface area: Brunauer-Emmett-Teller (BET) surface area analysis is the multi-point measurement of a material's specific surface area ($m^2/g$) through gas adsorption analysis, where an inert gas such as nitrogen is continuously flowed over a solid sample, or the solid sample is suspended in a defined gaseous volume. Small gas molecules adsorb to the solid substrate and its porous structures due to weak van der Waals forces, forming a monolayer of adsorbed gas. This monomolecular layer, and the rate of adsorption, can be used to calculate the specific surface area of a solid sample and its porous geometry.

Calcination: As used herein, the term "calcination" refers to a process to reduce, oxidize, or desiccate a material by roasting the material or exposing the material to strong heat.

Coordinating organic component: As used herein, the term "coordinating organic component" refers to a multi-functional ligand capable of binding to two or more metal or metalloid atoms.

Coordination polymer (CP): Coordination polymers are hierarchical materials defined by the assembly of metal entities and ligands (coordinating organic components) through coordination bonds. A CP can also be described as a polymer whose repeat units are coordination complexes. CPs are coordination compounds extending, through repeating coordination entities or units, in one dimension. The coordination entities include coordinating organic components or ligands and metal entities. Some CPs include cross-links between two or more individual chains, loops, or spiro-links, or include a coordination compound extending through repeating coordination entities in two or three dimensions. The secondary structure of CP molecules may be porous or nonporous. In some embodiments, the CP macrostructure (e.g., a structure comprising a plurality of CP molecules) is porous, and the size distribution of the pores can be broad. The porosity and structure span multiple scales from micro-(<2 nm) to meso-(2-50 nm) and macropores (>50 nm). The secondary structures of CPs (i.e., the structure of individual CP molecules or units) may or may not be porous. When the secondary structure is porous, the CP may be referred to as a metal organic framework (MOF). CPs can exist in an amorphous form, a crystalline from, or any combination thereof.

Equilibrium capacity: The point at which the rate of adsorption and desorption of analyte has reached a steady state. This point represents the quantity of adsorbate taken up by the adsorbent per unit mass (or volume) of the adsorbent. Temperature and time impact the kinetics to reach equilibrium capacity, but this capacity is an inherent property of the adsorbent (in this application, the nano-PIE).

Hierarchical material: Hierarchical materials are multi-component materials with an organized structure. Hierarchical materials include crystalline materials, self-assembled monolayers, and certain porous materials with an organized structure or framework. Exemplary hierarchical materials include, for example, metal-organic frameworks, coordination polymers, covalent-organic frameworks, metal-organic cages, and the like. Hierarchically structured porous materials may exhibit a porous architecture in which the porosity and structure span multiple scales from micro-(<2 nm) to meso-(2-50 nm) and macropores (>50 nm).

Incipient wetness/wet impregnation: Incipient wetness or wet impregnation, also called capillary impregnation, is a commonly used technique. Typically, a solution or suspension comprising a solute is combined with a solid porous material. Capillary action draws the solution into the pores. The maximum loading is limited by the solubility of the solute in the solution and the pore volume of the porous material.

Ionization efficiency: As used herein, ionization efficiency refers to the percentage of ions detected during TIMS analysis and may be calculated as:

$$\text{ionization efficiency}=(\text{atoms detected})/(\text{atoms loaded})\times 100.$$

Ion exchange resin or polymer: An ion-exchange resin or ion-exchange polymer is a resin or polymer that acts as a medium for ion exchange. Ion-exchange polymers and resins are typically porous, providing a large surface area on and inside the polymer where the trapping of ions occurs along with the accompanying release of other ions, and thus the process is called ion exchange.

Lanthanide: The lanthanide or lanthanoid series of chemical elements comprises the 15 metallic chemical elements with atomic numbers 57-71, from lanthanum through lutetium.

Metal organic framework (MOF): Metal—organic frameworks (MOFs) are a subclass of coordination polymers with the special feature that their secondary structures defining pores. MOFs generally exist in crystalline form, and possess orderly distributed micropores within the secondary structure. A bulk material comprising a MOF also may include macropores and/or mesopores in its macrostructure.

Modified nanoporous material: As used herein, the term "modified nanoporous material" refers to a material possessing pores of less than 100 nm that has been subjected to physical and/or chemical modifications. Exemplary modifications include, for example, combining with a sorbent, combining with metal nanoparticles, thermal treatment, chemical treatment, and the like.

Nanoporous ion emitter (nano-PIE): As used here, the term "nanoporous ion emitter (nano-PIE)" refers to a porous ion emitter comprising a hierarchical material (or a modified hierarchical material) having nanopores, i.e., pores having an average diameter of less than 100 nm.

Organo-metallic composition: A chemical composition containing at least one chemical bond between a carbon atom and a metal or metalloids.

Platinum group element: The platinum group elements include ruthenium, rhodium, palladium, osmium, iridium, and platinum.

Polycrystalline material: Polycrystalline materials are composed of many crystalline parts oriented in a random manner in the material.

Pore: One of many openings or void spaces in a solid substance of any kind. Pores are characterized by their diameters. According to IUPAC notation, micropores are small pores with diameters less than 2 nm. Mesopores are mid-sized pores with diameters from 2 nm to 50 nm. Macropores are large pores with diameters greater than 50 nm. Porosity is a measure of the void spaces or openings in a material, and is measured as a fraction, between 0-1, or as a percentage between 0-100%.

Porosity: A measure of the void spaces or openings in a material. Porosity is measured as a fraction, between 0-1, or as a percentage between 0-100%. The term pore volume refers to the combined volume of pores in a given mass of the material, often expressed in units of $cm^3/g$.

Porous ion emitter (PIE): A porous refractory material that has been developed as a thermal ionization emitter. A PIE has a non-hierarchical macro-porous structure and may be created from rhenium or platinum-rhenium metal powder bound by organic gluing agents. Some PIEs are carburized and/or loaded with cation-exchanging polymers.

Self-assembled monolayer: Self-assembled monolayers (SAM) of organic molecules are molecular assemblies formed spontaneously on surfaces by adsorption and are organized into more or less large, ordered domains.

Thermal ionization mass spectrometry (TIMS): Thermal ionization mass spectrometry (TIMS) is also known as surface ionization and is a highly sensitive isotope characterization technique. Singly or multiply charged ions of the sample are formed by thermal ionization. In an exemplary process, a sample comprising an analyte is placed on a metal filament. The removal of an electron from the sample is consequently achieved by heating the filament enough to release an electron, which then ionizes the atoms of the sample. TIMS utilizes a magnetic sector mass analyzer to separate the ions based on their mass to charge ratio. The ions gain velocity by an electrical potential gradient and are focused into a beam by electrostatic lenses. The ion beam then passes through the magnetic field of the electromagnet where it is partitioned into separate ion beams based on the ion's mass/charge ratio. These mass-resolved beams are directed into a detector where it is converted into voltage. The voltage detected is then used to calculate the isotopic ratio.

Transition metal: Any element in the d-block of the periodic table, which includes groups 3 to 12 on the periodic table.

II. NANO-PIES

The term nano-PIE refers to a hierarchical nanoporous ion emitter. Embodiments of the disclosed nano-PIEs are highly engineerable materials in which both composition and structure are tunable. Advantageously, the nano-PIE may have a well-dispersed, sponge-like interconnected network of nanopores, which enhances analyte ionization during TIMS analysis.

The nano-PIE is a hierarchical material, a modified hierarchical material, or a combination thereof. In some embodiments, the nano-PIE has an organo-metallic composition. Embodiments of the disclosed nano-PIEs retain one or more analytes of interest and enhance ionization of the analyte compared to other substrates, or the analyte alone, during TIMS analysis.

In any of the foregoing or following embodiments, the nano-PIE may comprise a single crystal, a polycrystalline material, a self-assembled monolayer, a modified nanoporous material, or any combination thereof. In some examples, the nano-PIE comprises a single crystal or a plurality of single crystals. In another example, the nano-PIE comprises a polycrystalline material. In yet another example, the nano-PIE comprises a self-assembled monolayer. In another embodiments, the nano-PIE comprises a modified nanoporous material. The modified nanoporous material may be amorphous, crystalline, or a mixture of amorphous and crystalline forms.

In any or all of the foregoing or following embodiments, the nano-PIE may comprise a metal or metalloid and a coordinating organic component. In some embodiments, the metal or metalloid comprises a transition metal, an alkali metal, a platinum group metal, or any combination thereof. In some embodiments, the coordinating organic component comprises an organic carboxylate, a heterocyclic ligand, or any combination thereof. In certain embodiments, the organic carboxylate comprises terephthalic acid, trimesic acid, 2,5-dihydroxyterephthalic acid, 2,2'-bipyridine-5,5'-dicarboxylic acid, or any combination thereof. Exemplary heterocyclic ligands include, but are not limited to, imidazolates, pyridyls, porphyrins, and the like.

In some embodiments, the nano-PIE comprises a coordination polymer (CP). In certain embodiments, the CP is a metal organic framework (MOF). In some implementations, the nano-PIE comprises a modified CP. In certain implementations, the modified CP is a modified MOF. In certain embodiments, the nano-PIE comprises a CP, a modified CP, or any combination thereof.

1. CPs

In some embodiments, the nano-PIE comprises a CP. CPs are hierarchical polymers defined by the assembly of metal entities and ligands (coordinating organic components or linkers) through coordination bonds. In some embodiments, the CP is a MOF.

As understood by a person of ordinary skill in the art, hierarchical structures of MOFs are generally formed by the self-crystallization of a coordinating organic component, or linker, coordinating with a metal salt, as illustrated in FIG. 1. Varying combinations of these two monomers result in unique pore morphologies and topologies. MOFs are typically characterized as having uniform, high surface area intra-crystalline pore structures with a large density of available coordination sites for analyte capture/sorption.

In certain embodiments, the MOF comprises MOF-253, M-MOF-74 (M is Ni, Mg, Mn, Co, Zn, or any combination thereof), MIL-101, UiO-66, ZIF-67, or any combination thereof.

Figure 2:
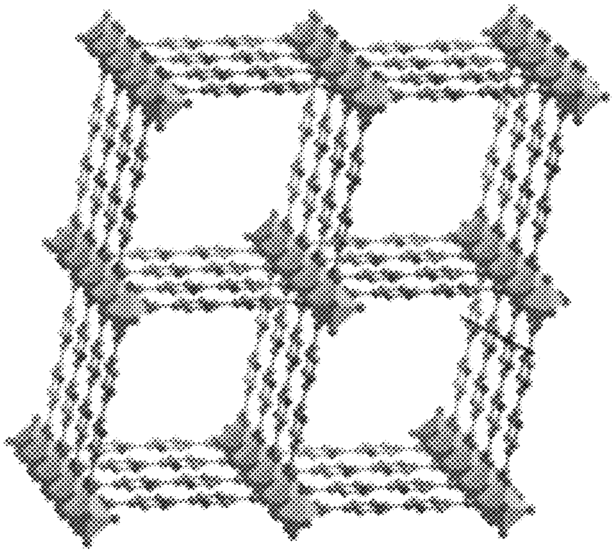
PRIOR ART FIG. 2
FIG. 2 shows is a modular representation of the structure of MOF-253 as reported by Bloch, et al. (*J Am Chem Soc* 2010, 132 (41), 14382-14384).

MOF-253 is an aluminum-based, bipyridine-containing MOF. This particular MOF, Al(OH)(bpydc) (Bloch et al. (*J Am Chem Soc* 2010, 132 (41):14382-14384) is prepared from the combination of a carboxylated bipyridine linker and aluminum chloride salt. In some embodiments, MOF-253 includes open N,N'-chelating pyridines available from the linker portion of the MOF structure that were shown to coordinate with a pentacarbonylchlororhenium (PCCR) complex. FIG. 2 shows an illustration of the crystalline structure of MOF-253.

Figure 3:
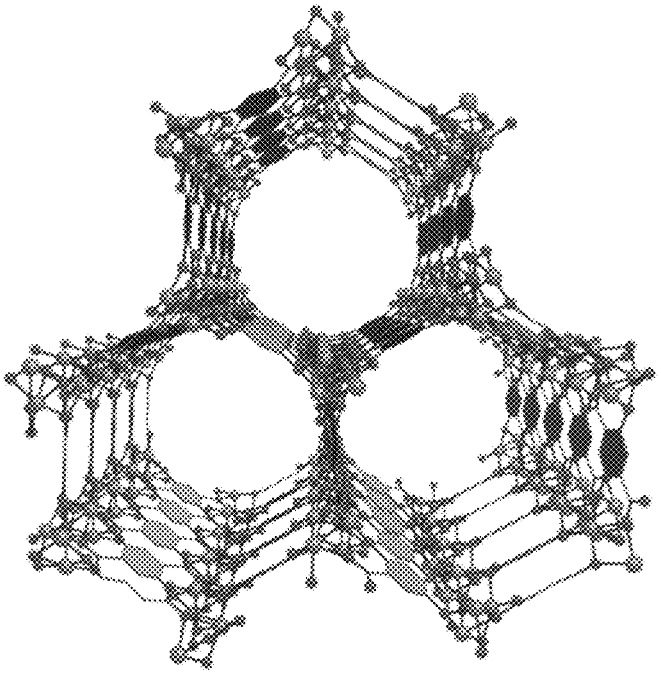
PRIOR ART FIG. 3
FIG. 3 is a modular representation of the single crystal structure of Mg-MOF-74 as reported by Britt, et al. (*PNAS* 106.49 (2009): 20637-20640).

M-MOF-74 is produced from the combination of divalent metallic cations with the organic ligand 2,5-dihydroxybenzene-1,4-dicarboxylate (DBDC). In some embodiments, the metal M is Ni, Mg, Mn, Co, Zn, or any combination thereof. FIG. 3 shows an illustration of the crystalline structure of Mg-MOF-74.

MIL-101 is a member of a large family of MOFs with a large Langmuir surface area (4500 $m^2 \cdot g^{-1}$), pore size (29-34 Å), and cell volume (702 Å). It is synthesized from HF—Cr$(NO_3)_3$-1,4-dicarboxylic acid-$(H_2BDC')H_2O$ (Férey, et al., *Science* 2005, 309(5743):2040-2042, 2005).

UiO-66 (Zirconium 1,4-dicarboxybenzene MOF) is a zirconium-based MOF with surface area 1000-1600 $m^2 \cdot g^{-1}$ BET and pore volume of 0.3-0.5 $cm^3/g$. UiO-66 is comprised of $Zr_6O_4(OH)_4$ octahedra that are 12-fold connected to adjacent octahedra through a 1,4-benzene-dicarboxylate (BDC) linker.

ZIF-67 (cobalt 2-methylimidazole) is a zeolitic imidazolate framework with a specific surface area of about 1500 $m^2 \cdot g^{-1}$.

2. Modified CPs

In some embodiments, the nano-PIE comprises a modified CP. In certain embodiments, the modified CP is a modified MOF. CPs may be synthetically modified to improve material functions. Examples of functions include, but are not limited to, retaining more analyte and/or increasing ionization of the analyte. In some embodiments, the modification process comprises combining the CP with a sorbent, combining the CP with metal nanoparticles, thermal treatment, chemical treatment, or any combination thereof. In certain examples, the modified CP better incorporates the analyte and/or increases ionization of the analyte compared to an unmodified CP and/or to the analyte in the absence of a CP.

In some embodiments, the modified CP is obtained by combining the CP with a sorbent. In some embodiments, the sorbent comprises an ion exchange polymer. In some embodiments, the sorbent comprise an ion exchange resin, such as an anion exchange resin, a cation exchange resin, or a combination thereof. In some embodiments, the sorbent comprises polystyrene sulfonate (PSS), sodium polystyrene sulfonate, poly(2-acrylamido-2-methyl-1-propanesulfonic acid) (polyAMPS), poly (acrylamido-N-propyltrimethylammonium chloride) (polyAPTAC), polyethylene amine, iminodiacetic acid, thiourea-based resins, or any combination thereof. In certain embodiments, the sorbent comprises PSS.

In some embodiments, the modified CP is obtained by combining CP with metal nanoparticles. For example, the CP may be modified by incorporating metal nanoparticles comprising a high work function and/or a highly refractory metal. In some embodiments, the metal nanoparticles comprise rhenium (Re), platinum (Pt), gold (Au), aluminum (Al), cobalt (Co), copper (Cu), iridium (Ir), manganese (Mn), nickel (Ni), palladium (Pd), tungsten (W), chromium (Cr), zirconium (Zr), zinc (Zn), or any combination thereof. In one implementation, the metal nanoparticles comprises rhenium (Re), the CP is MOF 253, and the modified CP is Re-MOF-253. In some embodiments, the metal nanoparticles are combined with the CP via a post-synthetic modification (e.g., as described by Bloch, et al., *J Am Chem Soc* 2010, 132(41):14382-14384).

In some embodiments, the modified CP is obtained by calcination. The CP may be treated at a temperature of from 100 to 1000° C., from 150 to 900° C., from 200 to 800° C., or from 300 to 700° C. In certain embodiments, the CP is treated at a temperature of from 400 to 600° C.

In some embodiments, the modified CP is obtained by chemical treatment. The chemical treatment may comprise grafting, solvent exchange, post-synthetic modification, or any combination thereof.

3. Nano-PIE Characteristics

In any of the foregoing or following embodiments, the nano-PIE may have an average pore diameter of from greater than 0 to 10 Å, from greater than 0 to 20 Å, from greater than 0 to 30 Å, from greater than 0 to 40 Å, from greater than 0 to 50 Å, from greater than 0 to 60 Å, from greater than 0 to 70 Å, from greater than 0 to 80 Å, from greater than 0 to 90 Å, from greater than 0 to 100 Å, from greater than 0 to 110 Å, from greater than 0 to 120 Å, from greater than 0 to 130 Å, from greater than 0 to 140 Å, or from greater than 0 to 150 Å. In certain embodiments, the nano-PIE has an average pore diameter of from greater than 0 to 100 Å. In certain embodiments, the average pore diameter is an average secondary structure pore diameter, e.g., an average pore diameter defined by a MOF or modified MOF crystalline structure.

In any of the foregoing or following embodiments, the nano-PIE may have a pore volume of from greater than 0 to 0.6 $cm^3/g$, from greater than 0 to 1 $cm^3/g$, from greater than 0 to 2 $cm^3/g$, from greater than 0 to 3 $cm^3/g$, from greater than 0 to 4 $cm^3/g$, from greater than 0 to 5 $cm^3/g$, from greater than 0 to 6 $cm^3/g$, from greater than 0 to 7 $cm^3/g$, from greater than 0 to 8 $cm^3/g$, from greater than 0 to 9 $cm^3/g$, or from greater than 0 to 10 $cm^3/g$. In certain embodiments, the nano-PIE has a pore volume of from greater than 0 to 5 $cm^3/g$.

In any of the foregoing or following embodiments, the nano-PIE may have a BET surface area of from greater than 0 to 1000 $m^2/g$, from greater than 0 to 2000 $m^2/g$, from greater than 0 to 3000 $m^2/g$, from greater than 0 to 4000 $m^2/g$, from greater than 0 to 5000 $m^2/g$, from greater than 0 to 6000 $m^2/g$, from greater than 0 to 7000 $m^2/g$, from greater than 0 to 8000 $m^2/g$, from greater than 0 to 9000 $m^2/g$, from greater than 0 to 10000 $m^2/g$, from greater than 0 to 11000 $m^2/g$, from greater than 0 to 12000 $m^2/g$, from greater than 0 to 13000 $m^2/g$, from greater than 0 to 14000 $m^2/g$, or from greater than 0 to 15000 $m^2/g$. In certain embodiments, the nano-PIE has a BET surface area of from greater than 0 to 8000 $m^2/g$.

In any of the foregoing or following embodiments, the nano-PIE may have an average crystallite size of from greater than 0 to 100 μm, from greater than 0 to 200 μm, from greater than 0 to 300 μm, from greater than 0 to 400 μm, from greater than 0 to 500 μm, from greater than 0 to 600 μm, from greater than 0 to 700 μm, from greater than 0 to 800 μm, from greater than 0 to 900 μm, or from greater than 0 to 1000 μm. In certain embodiments, the nano-PIE has an average crystallite size of from greater than 0 to 500 μm.

In certain embodiments, the nano-PIE has an average pore diameter of from greater than 0 to 100 Å, has a pore volume of from greater than 0 to 5 $cm^3/g$, has a BET surface area of from greater than 0 to 8000 $m^2/g$, and/or has an average crystallite size of from greater than 0 to 500 μm.

In any of the foregoing or following embodiments, the nano-PIE may be a MOF or modified MOF.

III. USING NANO-PIES IN TIMS ANALYSIS

Figure 4:
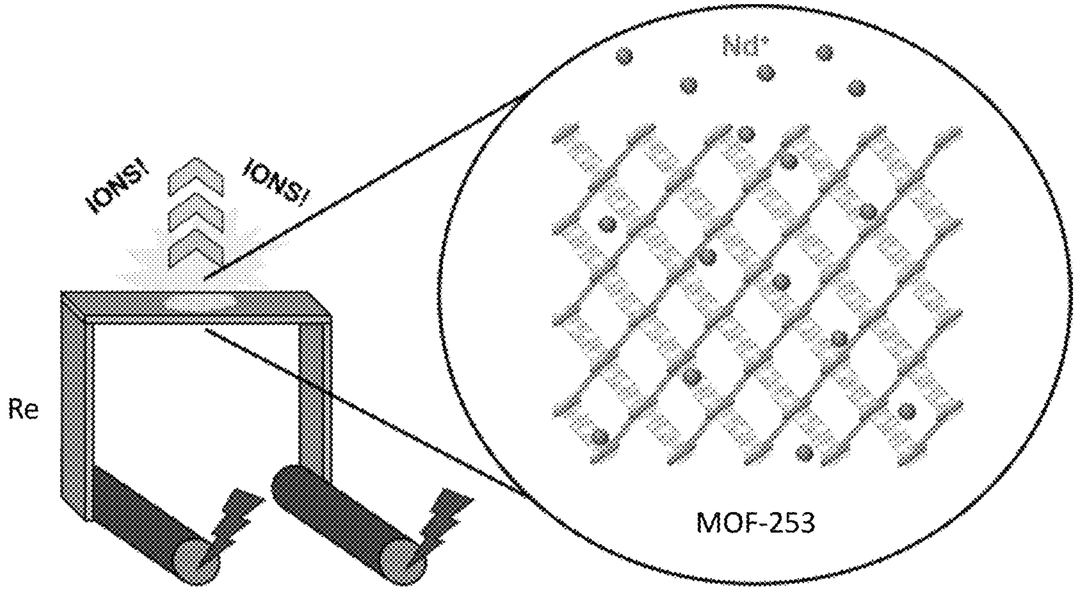
FIG. 4 shows one exemplary embodiment of using a nano-PIE comprising MOF-253 to improve analyte ionization during TIMS.

Embodiments of methods for using a nano-PIE during TIMS are disclosed. The nano-PIE may enhance, or promote, ionization efficiency of an analyte during the TIMS analysis, as compared to ionization efficiency of the analyte in the absence of the nano-PIE. FIG. 4 shows one exemplary embodiment of using a MOF to improve analyte ionization during TIMS. FIG. 4 is a non-limiting, exemplary schematic representation showing that Nd adsorbed by MOF-253 is ionized and released from the MOF during the TIMS analysis. Advantageously, the nano-PIE increases ionization efficiency compared to using other porous ion emitters and/or to analyzing the analyte in the absence of a porous ion emitter.

In some embodiments, the method includes loading a nano-PIE as disclosed herein and an analyte on a filament to create a loaded filament. The analyte typically comprises an element and may include any element in the periodic table except the noble gases. In certain embodiments, the analyte comprises an actinide, a lanthanide, a platinum group element, cesium, or iodine. Exemplary analytes include, but are not limited to, neodymium (Nd) and uranium (U). In any of the foregoing or following embodiments, the filament has a shape and dimensions suitable for use with TIMS and may comprise Re, Ta, W, Pt, or Ir.

In some embodiments, the method further comprises preparing the filament for loading the nano-PIE and analyte. In one working example, the filament was modified by applying parafilm to all but the center 2-3 mm of filament ribbon surface to create a hydrophobic barrier to confine the nano-PIE and analyte to a desired region on the filament. In some embodiments, the filament preparation is performed at room temperature.

In some embodiments, a mass ratio of the nano-PIE and the analyte is from $10^{18}$:1 to 10:1, from $10^{15}$:1 to 10:1, from $10^{12}$:1 to 10:1, from $10^{9}$:1 to 10:1, from $10^{6}$:1 to 10:1, $10^{3}$:1 to 10:1. In some embodiments, a mass of the analyte is from 1 attogram to 1 microgram, 1 attogram to 1 nanogram, 1 attogram to 1 picogram, or 1 attogram to 1 femtogram.

Embodiments of the disclosed method include loading a nano-PIE as disclosed herein and an analyte on a filament to create a loaded filament. In one embodiment, the nano-PIE is loaded on the filament by crystallizing the nano-PIE from a solution on the filament. In another embodiment, the nano-PIE is loaded on the filament by coating the nano-PIE on the filament. In yet another embodiment, the nano-PIE is loaded on the filament by printing the nano-PIE on the filament using 3D printing techniques. In still another embodiment, the nano-PIE is loaded on the filament by depositing a suspension comprising the nano-PIE on the filament.

In any of the foregoing or following embodiments, the method may further include combining and equilibrating the nano-PIE and the analyte. In some embodiments, the nano-PIE and the analyte are combined to create a nano-PIE-analyte mixture, and the nano-PIE-analyte mixture is equilibrated before loading on the filament. In other embodiments, the nano-PIE and the analyte are first combined to create a nano-PIE-analyte mixture, and the nano-PIE-analyte mixture is equilibrated after loading on the filament. In yet other embodiments, the nano-PIE is first loaded on the filament before combining with the analyte, and then combined with the analyte and equilibrated.

In some embodiments, the nano-PIE is combined with a solution or suspension comprising the analyte. In some implementations, the analyte is dissolved or suspended in a pH neutral solvent to provide a solution or suspension of the analyte. Suitable neutral solvents include, but are not limited to, water and lower alkanols (e.g., $C_1$-$C_6$ alkanols, such as methanol and ethanol). In certain embodiments, the pH neutral solvent is water, such as ultrapure water. In certain embodiments, the solid nano-PIE and the solution or suspension comprising the analyte are combined by impregnation, such as incipient wetness impregnation. For example, the solution or suspension comprising the analyte may be dispensed (e.g., by pipetting) on the nano-PIE, whereby the analyte is impregnated into the nano-PIE by capillary action. In some embodiments, a suspension comprising the nano-PIE is combined with a solution or suspension comprising the analyte to provide a slurry comprising the nano-PIE and the analyte. In some implementations, the suspension comprising the nano-PIE is a pH neutral solution. Suitable solvents include, but are not limited to, lower alkanols (e.g., $C_1$-$C_6$ alkanols, such as methanol and ethanol), water, or a combination thereof. Combining the nano-PIE and analyte may be performed before or after the loading the nano-PIE on the filament.

In some embodiments, the nano-PIE is combined with the analyte (e.g., as described above) to create a nano-PIE-analyte mixture, and the nano-PIE-analyte mixture is equilibrated to provide an equilibrated nano-PIE-analyte mixture. The nano-PIE-analyte mixture may be equilibrated before or after loading the nano-PIE-analyte mixture on the filament. In any of the foregoing or following embodiments, equilibration may include equilibrating the mixture until an equilibrium capacity is achieved. In some embodiments, equilibrating is conducted by incubating the combined nano-PIE and analyte for a period of time. In certain embodiments, the incubating time is from 5 minutes to an hour. In some embodiments, the incubating is conducted at room temperature (e.g., 20 to 25° C.). In certain embodiments, the nano-PIE-analyte mixture is loaded on the filament as a slurry, where a volume of the equilibrated nano-PIE-analyte mixture loaded on the filament is from 0.2 μL to 5 μL, from 0.2 μL to 2 μL, from 0.2 μL to 4 μL, from 1 μL to 5 μL, or from 2 μL to 5 μL. In certain embodiments, the volume is from 0.2 μL to 5 μL.

In any of the foregoing or following embodiments, the method may further comprise preparing the loaded filament for analysis by TIMS. In some embodiments, preparing the loaded filament for analysis by TIMS comprises drying the nano-PIE and analyte, applying a vacuum to the loaded filament to provide a treatment pressure less than atmospheric pressure, and applying a treatment current to the loaded filament under the treatment pressure for from 0 to 60 minutes to provide a treated filament.

In some embodiments, drying the nano-PIE and analyte comprises applying a current to the loaded filament. In some embodiments, the nano-PIE and analyte are dried at a current of greater than zero and less than a current effective to ionize the analyte. In certain embodiments, the current is from greater than zero to 2.5 A. In an independent embodiment, the loaded filament may be heated at a temperature sufficient to evaporate any solvent present in the nano-PIE-analyte mixture, thereby drying the nano-PIE and analyte. Suitable temperatures may range from 25-100° C., such as from 40-70° C.

In some embodiments, preparing the loaded filament for analysis by TIMS further comprises providing a carbon-based or nitrogen-based atmosphere while applying the treatment current to the loaded filament under the treatment pressure. In some implementations, the carbon-based atmosphere may comprise a hydrocarbon, such as vaporized benzene. The carbon-based atmosphere may carburize the loaded filament. In an independent implementation, the atmosphere comprises nitrogen gas. In some embodiments, the filament is treated under a pressure of from $3\times10^{-5}$ mbar to 0.1 mbar, while resistively heating the filament with a current of from 0.1 A and 5 A applied at a rate of from 0.01 A/min to 0.1 A/min. In certain implementations, the filament is carburized by treating in a benzene atmosphere of from $5\times10^{-5}$ mbar to 0.1 mbar. In some embodiments, the filament is held at the treatment current for 0 to 60 minutes. In some embodiments, the treatment current resistively heats the loaded filament, e.g., to a temperature of from 100 to 1000° C.

In some embodiments, the treatment pressure is from $3\times10^{-5}$ mbar to 0.1 mbar, from $1\times10^{-4}$ mbar to $1\times10^{-2}$ mbar, or from $1\times10^{-3}$ mbar to $1\times10^{-2}$ mbar. In some embodiments, the treatment current is from 0.1 to 5 A applied at a rate of from 0.01 to 0.1 A/min. In certain embodiments, the treatment current is from 0.1 A to 4 A, from 0.5 A to 3.5 A, from 1 A to 3 A, or from 1.5 A to 2.5 A. In some embodiments, the current is applied for from 0 to 60 minutes, 1 to 60 minutes, 10 to 45 minutes, or 15 to 30 minutes to create a treated filament.

In some embodiments, the method further comprises conducting an analysis of the analyte by TIMS as is known to those skilled in the art of TIMS analysis.

In certain embodiments, a method for TIMS analysis comprises loading a nano-PIE-analyte mixture comprising the nano-PIE and an analyte on a filament to create a loaded filament wherein a mass ratio of the nano-PIE to the analyte is from $10^{15}$:1 to 10:1, drying the nano-PIE-analyte mixture, applying a vacuum to the loaded filament to provide a treatment pressure of from $3\times10^{-5}$ mbar to 0.1 mbar, applying a treatment current from 0.1 A to 5 A at a rate of from 0.01 A to 0.1 A/min to the loaded filament under the treatment pressure for from 0 to 60 minutes to create a treated filament, and conducting an analysis by TIMS.

In some embodiments, the nano-PIE provides a greater analyte ionization efficiency during TIMS than traditional loading techniques, such as phosphoric acid or other porous ion emitters lacking a hierarchical structure. Advantageously, some embodiments of the disclosed nano-PIEs provide enhanced ionization efficiency without requiring high work function metals (such as Re) and/or without required carburization. Without wishing to be bound by a particular theory of operation, the carbon present in the nano-PIE eliminates the need for carburization. In certain embodiments, inexpensive non-refractory metals, such as Al, in the nano-PIE do not inhibit ionization. In some embodiments, the ionization efficiency is at least 1.1 times greater than an ionization efficiency of the analyte in the absence of the nano-PIE, such as ionization efficiencies obtained with phosphoric acid, resin beads, or other porous ion emitters lacking a hierarchical structure, or in the absence of any material other than the analyte and filament. In certain implementations, the ionization efficiency is from 1.1 to 5 times greater than the ionization efficiency of the analyte in the absence of the nano-PIE, such as from 1.1 to 4 times greater, 1.1 to 3 times greater, or 1.1 to 2 times greater than the ionization efficiency of the analyte in the absence of the nano-PIE. In one working embodiment, MOF-253 emitted 350% more ions than the traditional activator, phosphoric acid.

IV. KITS

Embodiments of a kit comprising a filament suitable for TIMS and a quantity of a nano-PIE are encompassed by this disclosure. In some embodiments, the kit comprises a plurality of filaments and a quantity of nano-PIE sufficient for a plurality of analyses. For example, the kit might include from 1-500, 1-200, 1-100, 1-50, 1-25, or 1-10 filaments. In some implementations, the kit includes from 1 mg to 250 mg of the nano-PIE, such as from 5 mg to 500 mg, 10 mg to 250 mg, or 25 mg to 100 mg of the nano-PIE. The nano-PIE may be provided in solid form or as a suspension in a suitable solvent (e.g., an alcohol, water, or a combination thereof). In some embodiments, the kit further comprises instructions for loading a filament with the nano-PIE and an analyte.

In any or all of the foregoing or following embodiments, the filament suitable for TIMS may comprise Re, Ta, W, Pt, or Ir, or the kit may include a plurality of filaments having different compositions.

In any or all of the foregoing embodiments, the nano-PIE may comprise a CP, a modified CP, or any combination thereof. In some embodiments, the CP is a MOF and/or the modified CP is a modified MOF. In some embodiments, the nano-PIE comprises MOF-253, M-MOF-74 (M is Ni, Mg, Mn, Co, Zn, or any combination thereof), MIL-101, UiO-66, ZIF-67, or any combination thereof. In certain embodiments, the nano-PIE comprises MOF-253 or M-MOF-74.

V. REPRESENTATIVE EMBODIMENTS

Certain representative embodiments are exemplified in the following paragraphs.

A method, comprising preparing an analyte for thermal ionization mass spectrometry (TIMS) analysis by loading a nanoporous ion emitter (nano-PIE) and an analyte on a filament to create a loaded filament, wherein the nano-PIE is a hierarchical material, a modified hierarchical material, or a combination thereof.

The method of the preceding paragraph, wherein the nano-PIE comprises a single crystal, a polycrystalline material, a self-assembled monolayer, a modified nanoporous material, or any combination thereof.

The method of either of the preceding paragraphs, wherein the nano-PIE comprises a metal or metalloid and a coordinating organic component.

The method of the preceding paragraph, wherein (i) the metal or metalloid comprises a transition metal, an alkali metal, a lanthanide, or any combination thereof; or (ii) the coordinating organic component comprises an organic carboxylate, a heterocyclic ligand, or any combination thereof; or (iii) both (i) and (ii).

The method of the preceding paragraph, wherein the organic carboxylate comprises terephthalic acid, trimesic acid, 2,5-dihydroxyterephthalic acid, 2,2'-bipyridine-5,5'-dicarboxylic acid, or any combination thereof.

The method of any one of the preceding paragraphs, wherein the nano-PIE comprises: a coordination polymer (CP) or a modified CP, wherein the modified CP is obtained by combining a CP with a sorbent, combining a CP with a metal nanoparticle, thermal treatment, chemical treatment, or any combination thereof; or any combination thereof.

The method of the preceding paragraph, wherein the CP or the modified CP has: (i) an average pore diameter of from greater than 0 to 100 Å; or (ii) a pore volume of from greater than 0 to 5 $cm^3/g$; or (iii) a BET surface area of from greater than 0 to 8000 $m^2/g$; or (iv) an average crystallite size of from greater than 0 to 500 μm; or (v) any combination of (i)-(iv).

The method of either of the two preceding paragraphs, wherein the CP is a MOF and/or the modified CP is a modified MOF.

The method of the preceding paragraph, wherein the MOF or modified MOF comprises MOF-253; M-MOF-74 where M is Ni, Mg, Mn, Co, Zn, or any combination thereof; MIL-101; UiO-66; ZIF-67; or any combination thereof.

The method of any one of the preceding paragraphs, wherein: (i) a mass ratio of the nano-PIE and the analyte is from $10^{15}$:1 to 10:1; or (ii) a mass of the analyte is from 1 attogram to 1 microgram; or (iii) both (i) and (ii).

The method of any one of the preceding paragraphs, wherein loading the nano-PIE on the filament comprises: crystallizing the nano-PIE from a solution on the filament; or coating the nano-PIE on the filament; or printing the nano-PIE on the filament using 3D printing; or depositing a suspension comprising the nano-PIE on the filament.

The method of any one of the preceding paragraphs, where loading the nano-PIE and the analyte on the filament comprises: combining the nano-PIE with the analyte to create a nano-PIE-analyte mixture; and (i) equilibrating the nano-PIE-analyte mixture to provide an equilibrated nano-PIE-analyte mixture, and then loading the equilibrated nano-PIE-analyte mixture on the filament, or (ii) loading the nano-PIE-analyte mixture on the filament, and then equilibrating the nano-PIE-analyte mixture to provide an equilibrated nano-PIE-analyte mixture.

The method of the preceding paragraph, where combining the nano-PIE with the analyte comprises: combining the nano-PIE with a solution or a suspension comprising the analyte; or combining a suspension comprising the nano-PIE with a solution or suspension comprising the analyte to provide a slurry comprising the nano-PIE and the analyte.

The method of either of the preceding two paragraphs, wherein: the nano-PIE-analyte mixture or the equilibrated nano-PIE-analyte mixture is loaded on the filament as a slurry; and a volume of the nano-PIE-analyte mixture or the equilibrated nano-PIE-analyte mixture loaded on the filament is from 0.2 μL to 5 μL.

The method of any one of the preceding paragraphs, wherein the analyte comprises an actinide, a lanthanide, a platinum group element, cesium, or iodine.

The method of any one of the preceding paragraphs, further comprising preparing the loaded filament for analysis by TIMS by: drying the nano-PIE and analyte on the loaded filament; applying a vacuum to the loaded filament to provide a treatment pressure less than atmospheric pressure;

and applying a treatment current to the loaded filament under the treatment pressure for from 0 to 60 minutes to provide a treated filament.

The method of the preceding paragraph, wherein drying the nano-PIE and analyte comprises applying a current to the loaded filament, where the current is greater than 0 A and less than a current effective to ionize the analyte.

The method of either of the preceding two paragraphs, wherein: (i) the treatment pressure is from $3\times10^{-5}$ mbar to 0.1 mbar; or (ii) the treatment current is from 0.1 A to 5 A applied at a rate of from 0.01 to 0.1 A/min; or (iii) both (i) and (ii).

The method of any one of the preceding three paragraphs, further comprising providing a carbon-based or nitrogen-based atmosphere while applying the treatment current to the loaded filament under the treatment pressure.

The method of any one of the preceding paragraphs, further comprising conducting an analysis of the analyte on the treated filament by TIMS.

A method, comprising promoting ionization efficiency of an analyte during TIMS by loading a nano-PIE-analyte mixture comprising the nano-PIE and an analyte on a filament to create a loaded filament, wherein a mass ratio of the nano-PIE to the analyte is from $10^{15}$:1 to 10:1; drying the nano-PIE-analyte mixture; applying a vacuum to the loaded filament to provide a treatment pressure of from $3\times10^{-5}$ mbar to 0.1 mbar; applying a treatment current of from 0.1 A to 5 A applied at a rate of from 0.01 to 0.1 A/min to the loaded filament under the treatment pressure for from 0 to 60 minutes to create a treated filament; and conducting an analysis by TIMS.

A method, comprising providing a loaded filament comprising a filament, a quantity of a nano-PIE disposed on the filament, and a quantity of an analyte disposed on the nano-PIE or within pores of the nano-PIE; and conducting an analysis of the analyte by TIMS.

The method of the preceding paragraph, further comprising treating the loaded filament by applying a treatment current of from 0.1 A to 5 A applied at a rate of from 0.01 to 0.1 A/min under a treatment pressure less than atmospheric pressure before conducting the analysis.

The method of either of the preceding paragraphs, wherein (i) the nano-PIE comprises a CP, a modified CP, or any combination thereof; or (ii) the analyte comprises an actinide, a lanthanide, a platinum group element, Cs, or iodine; or (iii) both (i) and (ii).

A kit, comprising a filament suitable for TIMS, and a quantity of a nano-PIE.

The kit of the preceding paragraph, wherein the nano-PIE comprises a CP, a modified CP, or any combination thereof.

VI. EXAMPLES

Method for Nd Analysis a. MOF Selection and Synthesis

Using the approach described by Bloch et al. (*J Am Chem Soc* 2010, 132 (41):14382-14384), Re was incorporated into a MOF via post-synthetic modification. This particular MOF, Al(OH)(bpydc), named MOF-253, is derived from the combination of a carboxylated bipyridine linker and aluminum chloride salt. MOF-253 was chosen given the presence of open N,N'-chelating pyridines available from the linker portion of the MOF structure, that were shown to coordinate with a pentacarbonylchlororhenium (PCCR) complex.

The synthesis of MOF-253 was performed using commercially available reagent grade chemicals in a standard wet laboratory. The linker, 2,2'-bipyridine-5,5'-dicarboxylic acid (bpydc), and the metal salt, $AlCl_3.6H_2O$, were suspended in solvent grade dimethylformamide and heated at 120° C. for 24 h. Further details regarding washing and isolation of MOF product are described in detail by Bloch et al.

The as-synthesized MOF was de-solvated under vacuum at 150° C. overnight, then refluxed with $Re(CO)_5Cl$ under anhydrous toluene at 40° C. for 2 h under $N_2$ atmosphere. After reaction, the resultant powder was filtered and washed with methanol and dried under vacuum to give the yellow, solid, rhenium functionalized MOF, herein denoted Re-MOF-253.

b. Sample Preparation for TIMS and Analysis

A 50 ppb JNdi-1 standard in a matrix of high purity water was used for all analyses. Each MOF was tested as a porous ion emitter by combining 1 μL of JNdi-1 standard and 1 μL of MOF suspension (at a concentration of 50 μg MOF/1 μL ultra-pure $H_2O$). This mixture was then pipetted onto a previously outgassed (at 4.5 A for 45 min) high purity, zone-refined single Re filament (procured from H. Cross Company, Moonachie, New Jersey). Prior to loading the sample, Parafilm™ (Bemis Company, Neenah, WI) dams were applied to restrict the sample to the center 3-5 mm of the surface. The solution-laden filament was then heated by applying a current of 1 A to dry the sample. The time it took to add the Nd-containing MOF solution to each filament was less than 2 minutes per filament. Samples prepared with phosphoric acid as a control were loaded by mixing 0.5 μL 3M phosphoric acid with the JNdi-1 solution and drying at 1.8 A.

Samples were next treated in two ways in a degas bench (Nu Instruments, North Wales, UK): carburization or heating. In both cases, the chamber was pumped to 3E-5 mbar. Carburized filaments were treated with a benzene bleed at 1E-4 mbar while resistively heating the filament to 1 A (approximately 500° C.) at a rate of 0.1 A/min, held at this current for 20 minutes, and returned to 0 A in 30 seconds. Heated filaments underwent the same routine without the introduction of benzene to the system.

Note that no attempt was made to optimize this routine for maximum ionization efficiency—1 A was chosen as heating beyond this current resulted in apparent MOF-sample loss based on visual assessment. Further optimization specific to MOF loads could yield even higher ionization efficiencies. Samples presented in this study were prepared in duplicate.

All analyses were performed on a Nu Instruments TIMS equipped with 21 detectors including 5 full-sized ion counters. The instrument is fitted with a dual wavelength reference pyrometer to monitor filament temperatures. Instrument backgrounds were measured at half mass positions before the start of every analysis. Masses 142 to 146 were monitored over a 4-cycle analysis with the mass 144 beam being moved successively through each ion counter to correct for signal drift and calibrate ion counter gains. The vacuum in the source was kept as low as possible using a liquid nitrogen cold trap, typically at 8E-9 mbar. All samples were heated at a rate of 1 mA/sec to approximately 2 A (approximately 1200° C.) before the line-of-sight valve was opened to look for a signal. Ionization efficiency was calculated by integrating the total ions detected (as counts per second) over the lifetime of the beam, including ions observed during warm up, signal optimization and the analysis itself, and dividing by total atoms loaded on to the filament.

Example 1

Structure and Composition of Synthesized MOFs a. Sample Characterization

Prior to Nd uptake and subsequent TIMS analysis, the synthesized MOFs were characterized to confirm their intended structure and composition. A Rigaku MiniFlex® 600 X-ray diffractometer (Rigaku, Tokyo, Japan) was used to confirm the structural integrity of the synthesized MOF. The powder sample was placed in a holder under ambient conditions and the diffraction pattern was collected over the scattering angle 2θ range of 4°-30° using a Cu X-ray source. The scan rate was 2° $min^{-1}$.

The textural properties of synthesized MOFs were also characterized using a Micromeritics® ASAP 2020 porosimeter (Micromeritics, Norcross, GA). Experiments were performed using ~0.1 g of each MOF subjected to $N_2$ sorption and desorption at 77K. Prior to experiment, the samples were de-gassed under vacuum at 180° C. From this experiment, surface area and pore volumes were extracted by data reduction via B.E.T. theory.

An inductively coupled plasma optical emission spectrometer (ICP-OES) (Perkin Elmer Optima™ 8300 DV) (Perkin Elmer, Waltham, MA) was used to analyze the elemental composition of digested MOF. Digestions were performed using 7M nitric acid with addition of trace hydrofluoric acid (0.01 vol %) on a hot plate set to 80° C. However, dissolution was incomplete as particulates precipitated each time the solution cooled to room temperature. These solids were filtered before further dilution and subsequent, qualitative analysis.

MOF-loaded filaments were also imaged at each stage of sample utilization (before treatment in the degas bench, after heating or carburization, and after analysis) using Helium Ion Microscope (HIM) developed by Carl Zeiss© (Carl Zeiss, Oberkochen, Germany). HIM has certain advantages over traditional SEM since it has a very high resolution (~0.5 nm) and very high depth of field (>few microns). Before the imaging, 5 nm thick carbon film was deposited on the sample surfaces to avoid the sample charging during HIM analysis. 35 keV helium ions were used to generate the secondary electrons from the sample and emitted electrons were analyzed using Everhart-Thornley (ET) Detector. Different magnification images were recorded using 1 ms dwell time and averaged.

b. Results and Discussion i. MOF Structure and Composition

Figure 5B:
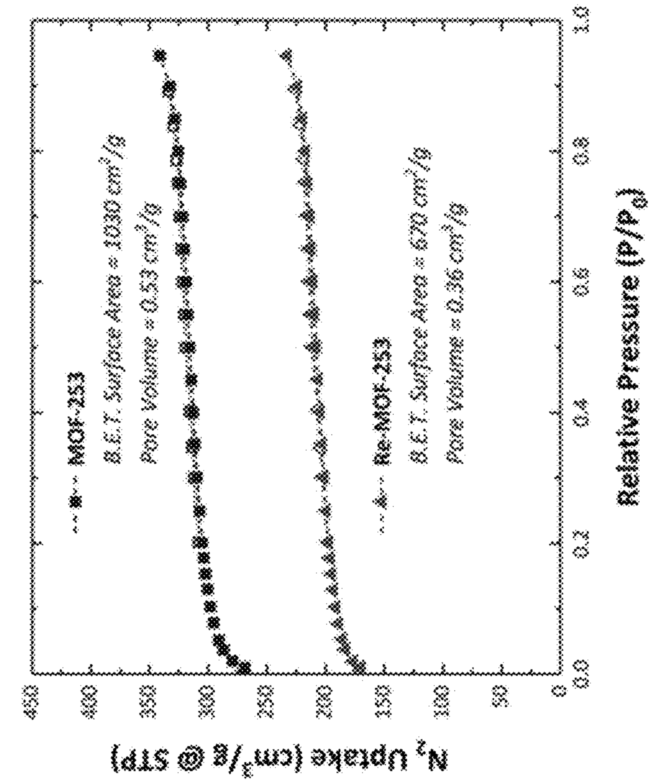
FIGS. 5A-5B show powder X-ray diffraction (PXRD) spectra of synthesized MOF-253 and Re-MOF-253 compared to the calculated spectra of analogous Al(OH)(bpdc) MOF, also known as DUT-5 (FIG. 5A); porosimetry analysis via $N_2$ adsorption (filled) and desorption (unfilled) at 77K for synthesized MOF-253 and Re-MOF-253 (FIG. 5B).
Figure 5A:
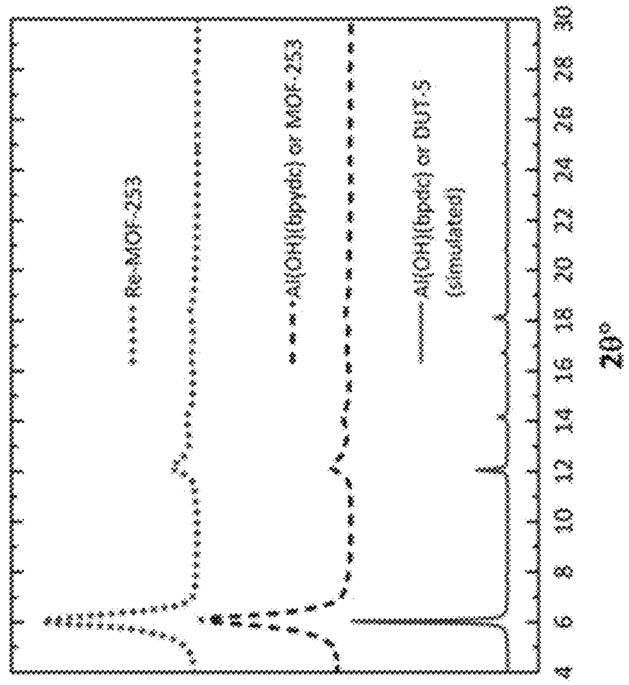
Figure 6:
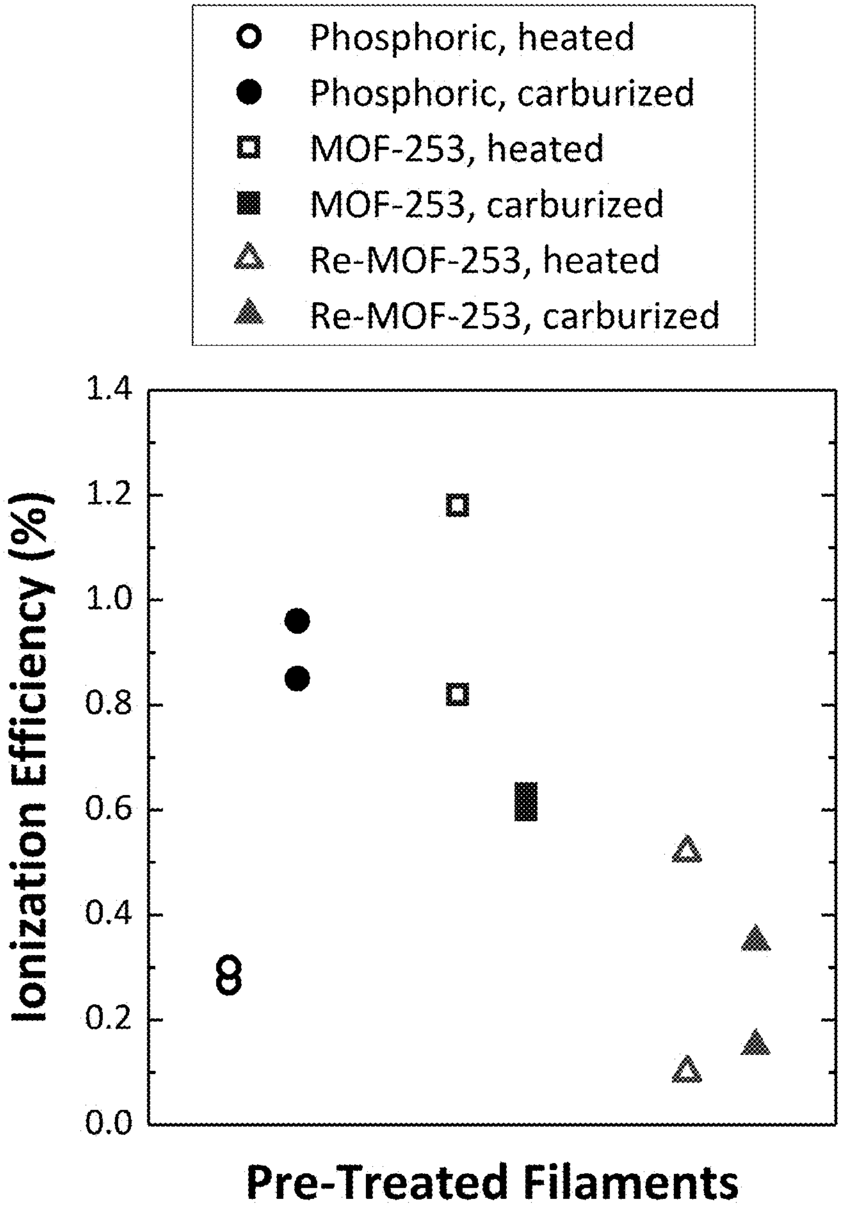
FIG. 6 shows Nd ionization efficiency for duplicate TIMS filaments prepared using a control (phosphoric acid), MOF-253, and Re-MOF-253.

Powder X-ray diffraction spectra (PXRD) (Rigaku MiniFlex® 600 X-ray diffractometer; Rigaku, Tokyo, Japan) (FIG. 5A) of the synthesized MOF-253 and Re-MOF-253 showed the presence of dominant diffraction peaks (at 6°, 12° and 18° 2θ) consistent with the spectra of the analogous Al(OH)(bpdc) MOF material, also known as DUT-5. The decreased diffraction intensities are likely attributed to the existence of disorder within the sample after incorporation of Re. MOF porosity was also confirmed using $N_2$ sorption experiments at 77K (FIG. 5B) showing characteristic isotherm shape representative of micropore filling at low pressures followed by macropore filling at higher pressures. Due to the loading of Re within the MOF pore, porosimetry analysis revealed a reduced available surface area and pore volume for Re-MOF-253 (670 $cm^2/g$ and 0.36 $cm^3/g$, respectively) compared to parent MOF-253 (1030 $cm^2/g$ and 0.53 $cm^3/g$, respectively). Elemental compositions of each MOF sample showed that the parent MOF-253 primarily contained only aluminum with small amounts of other elements (Ba, Ca, Cr, Fe, Pb, Mn, Mg, Ni, P, K, Si, Na, Zn) likely from impurities in metal salts used to synthesize the MOF. Similarly, Re-MOF-253 primarily contained only rhenium and aluminum, as expected. It should be noted that the textural properties and observed Re concentration ratio for the samples were less than those reported for this procedure likely due to experimental error associated with MOF activation and consequently, the availability of the N,N'-chelating sites.

Example 2

Performance of MOFs

Various TIMS filaments were prepared for Nd analysis: (1) a control sample containing no MOF, only stock Nd standard (JNdi-1) in a phosphoric acid solution; (2) a sample containing MOF-253 pre-mixed with stock Nd; and (3) a sample containing Re-MOF-253 pre-mixed with stock Nd. The samples were prepared and deposited on a fixed region on the filament.

a. Ionization Efficiency

Results showing the Nd ionization efficiency using the corresponding MOF platforms and control with both pretreatments are shown in 6. A comparison of the Nd loading techniques and TIMS ionization efficiencies performed on flat, Re filaments is shown in Table 1.

TABLE 1

Comparison of our Nd loading techniques and TIMS ionization efficiencies performed on flat, Re filaments with Wakaki et al. and Burger et al. techniques.

| Sample Size (pg) | Loading Method | Efficiency (%) | Std. Dev. | n | Reference |
|---|---|---|---|---|---|
| 100 | Liquids, $H_3PO_4$ | 0.36% | ±0.17% | 10 | Wakaki* |
| 1000-10000 | Liquid, no additive | 0.85% | NA | NA | Burger** |
| 200 | Resin bead, carbon | 2.10% | ±0.23% | 6 | Burger** |
| 50 | Phosphoric (heated) | 0.30% | ±0.02% | 2 | This Work |
| 50 | Phosphoric (carburized) | 0.90% | ±0.08% | 2 | This Work |
| 50 | MOF-253 (heated) | 1.00% | ±0.25% | 2 | This Work |

*Int J Mass Spectrom 2007, 264 (2-3), 157-163

**Int J Mass Spectrom 2009, 286 (2-3), 70-82.

The parent MOF-253 alone, without the addition of rhenium metal or carburization, showed relatively high ionization efficiencies (~1%). These values are comparable to the carburized control sample and approximately 3× higher than the heated control sample. This comparison with a control filament elucidates the importance of incorporating a porous material that can concentrate the Nd to a fixed region from which it can ionize. However, the incorporation of the high work function Re metal within the porous MOF led to a decrease in Nd ionization. The hypothesized increase in ionization from an increased composition of high work function metal within the PIE was not observed. Without wishing to be bound by a particular theory, this could be due to a non-optimized concentration of Re on the MOF. The reduced ionization in Re-MOF-253 may also be directly related to reduced Nd uptake/content on the filament. Given the loading of rhenium atoms within MOF-253 pores, and the resulting known decrease in surface area/pore volume of Re-MOF-253, there was presumably less volume for Nd to load into. Importantly, this ionization efficiency calculation assumes all the Nd added to the filament was still present on the filament prior to TIMS analysis (after pre-treatment), which was not evaluated in this study. It is interesting to note that carburization (heating in the presence of benzene) for MOF-253 with and without Re did not yield higher ionization. It is speculated that the benzene is not necessary for this MOF platform since the structure contains a network of carbon-containing organic ligands already. Together with the high work function metal, these organic, carbon-based ligands can provide the electron transport pathway required to facilitate ionization throughout the entire nano-PIE. Moreover, removing the need for carburization is an appealing advantage for operational ease and sample preparation reproducibility because of the toxicity of benzene handling in the laboratory and the customization required to degas benches for its use.

b. Ion Emission Profiles

Figures 7A, 7B, 7C:
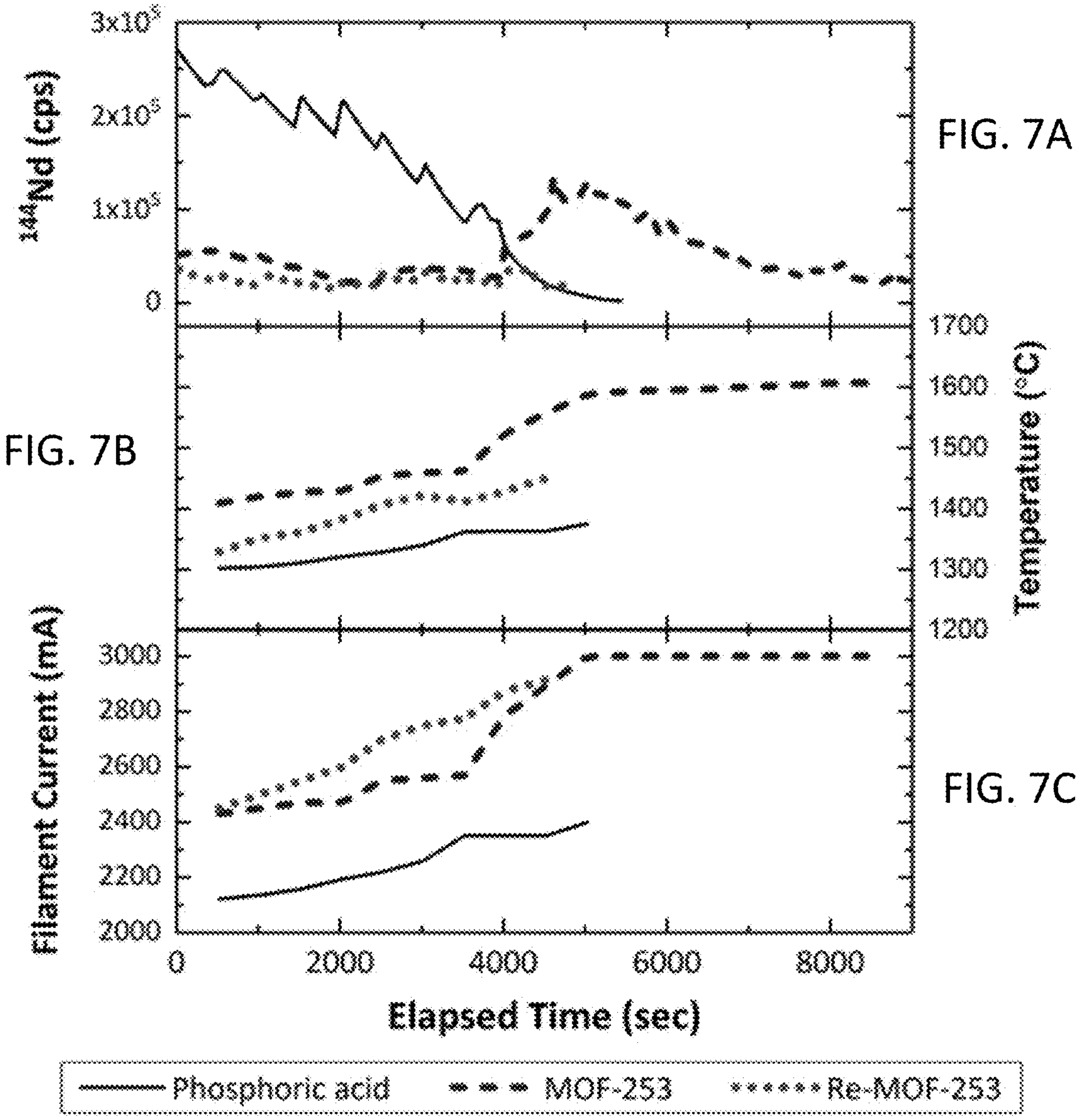
FIGS. 7A-7C are emission, temperature, and current profiles of control (phosphoric; black solid line), MOF-253 (blue dashed line), and Re-MOF-253 analyses (red dotted line).

Ion emission profiles for these different activators provided insight into how MOFs may be encouraging ionization. Example profiles of the highest ionization efficiency loads for each activator are presented in FIGS. 7A-7C. While the carburized phosphoric analysis exhibited decreasing ion emission for the length of the analysis despite increasing filament current, both MOF analyses maintained relatively stable emission rates at similar rates of current increase. The current required for Nd ion emission with the MOF was higher compared to the phosphoric acid control. This suggests that Nd may be forming an intermediate species within the MOF structure which stabilizes evaporation to temperatures at which ionization is more favorable. It may also suggest that the kinetics of ionization from Nd captured/sorbed within the MOF scaffold to Nd being volatilized and leaving the filament may encounter additional energy barriers as compared to the Nd initially present on a filament without the MOF. Interestingly, in the case of MOF-253, ion emission extended twice as long as the other loading strategies and at currents greater than 2.7 A, ion emission became unstable such that a significant pulse of Nd ions was observed in a shorter timeframe. This suggests that the MOF structure itself was undergoing delamination or degradation and releasing any entrapped Nd that may still be present within the MOF.

c. Possible Structural Modifications to the MOF

Figure 8A:
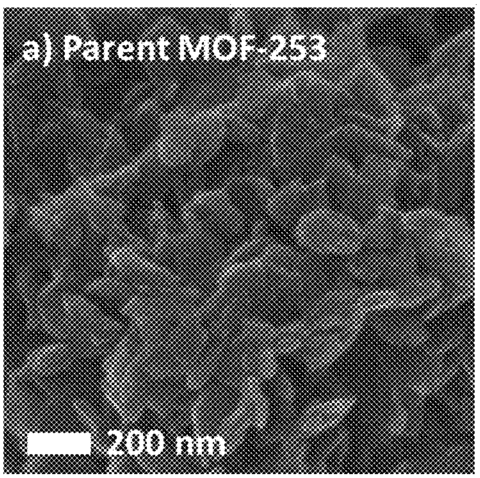
FIGS. 8A-8D are helium ion microscopy images of MOF-253 loaded with Nd before treatment (FIG. 8A), after heating (FIG. 8B), after carburization (FIG. 8C), and after TIMS analysis (FIG. 8D).
Figure 8B:
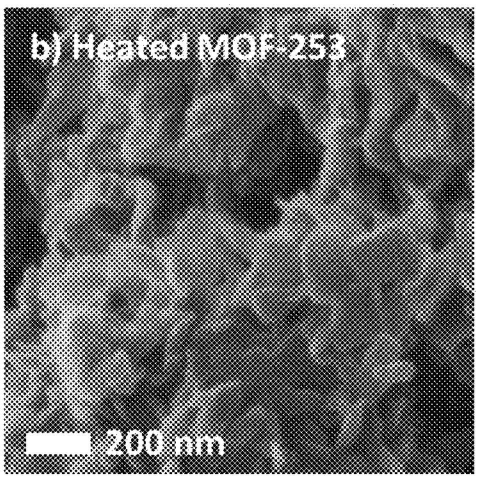
Figure 8C:
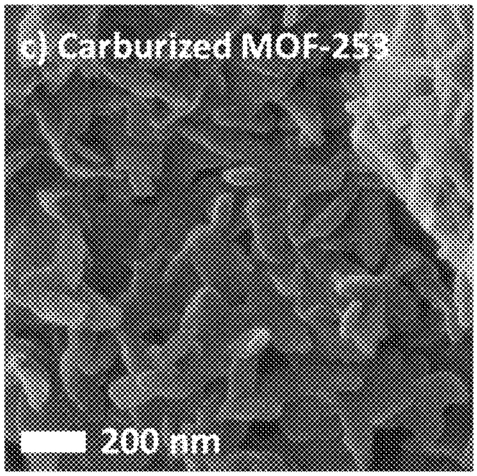
Figure 8D:
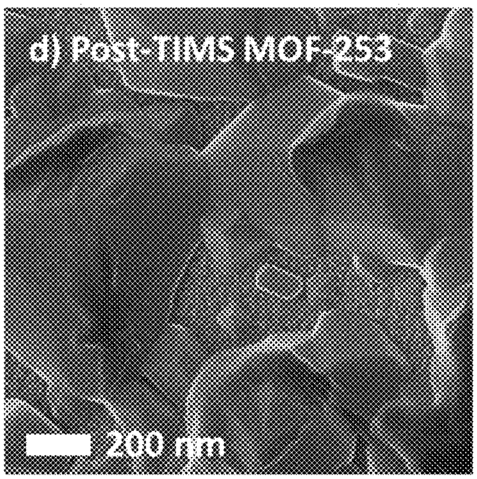
Figure 9A:
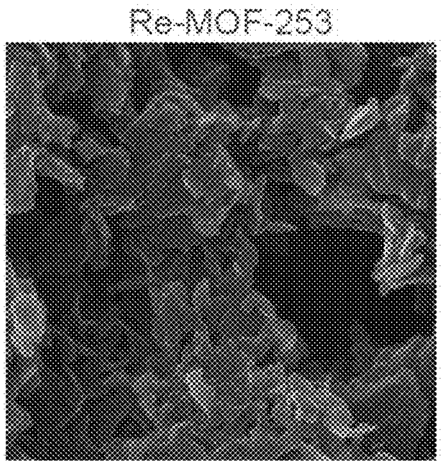
FIGS. 9A-9B are microscopy images of Re-MOF-253 (FIG. 9A) and carburized Re-MOF-253 (FIG. 9B) before TIMS analysis.
Figure 9B:
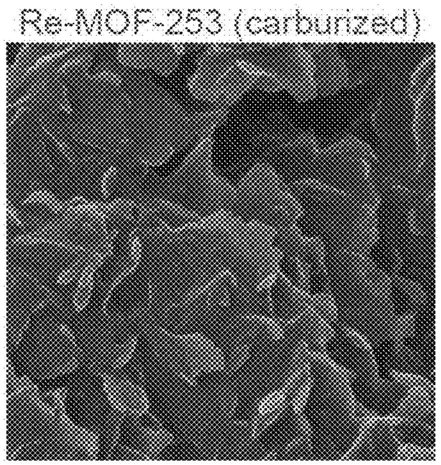

To gain insight into the possible degradation of the MOF structure/porosity, several filaments pulled during the loading, pre-treatment, and post-analysis steps of TIMS analysis were characterized via microscopy images (FIGS. 8A-8D, FIGS. 9A-9B). Compared to the parent (untreated and unmodified) MOF-253, the treated samples showed little difference. The images are characterized by plate-like, approximately 200 nm long crystals and, despite being heated or carburized, maintained intra-crystalline porosity. Structural observation of Re-MOF-253 before TIMS analysis is shown in FIG. 9A (before carburization) and FIG. 9B (carburized). Post-TIMS analysis imaging of MOF-253 showed that most of the smaller crystallite particulate features had been lost (FIG. 8D). As a result of high temperatures during TIMS analysis, the MOF structure likely collapsed to form larger, micron-sized agglomerates.

d. Discussion

It should be noted that the aluminum which makes up both parent MOF-253 and the backbone structure of Re-MOF-253 is a relatively low work function metal compared to metals usually applied to TIMS applications. However, the high electrical conductivity of Al, a parameter not typically associated with TIMS loading methods, may support the potential formation of positively charged particles by providing a medium to shuttle electrons for ionization. The presence of any other non-analyte metal in the case of ion-emitter platforms (in this study, aluminum, rhenium, and other impurities) is typically believed to inhibit ionization because of a competing ion effect ($1^{st}$ ionization energy: 577.5 kJ/mol for Al metal vs. 533 kJ/ml for Nd metal). Since MOF platforms may provide varying redox states for incorporated metals, the competition for the energy of ionization might be reduced. Given this traditional ideology, ion-emitter platforms are usually designed to be as pure as possible containing one or two high work function metals in the presence of the analyte. Knowing this, the results uniquely challenge this approach and showed that the highly porous engineered MOF structure of MOF-253 containing Al framework metals did not significantly inhibit Nd ionization. Furthermore, trace element characterization of the MOFs showed the presence of multiple metals which should even further inhibit sample ionization. Instead, the presence of homogenously distributed rhenium metal, originally expected to enhance ionization through the conventional approach, was shown to reduce analyte ionization compared to the MOF without rhenium.

For this set of samples, the observed ionization efficiencies from MOF-253 is attributed to a concentrated, yet well-dispersed amount of Nd captured and more easily ionized from within the high porosity nano-PIE.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:

preparing an analyte for thermal ionization mass spectrometry (TIMS) analysis by loading a nanoporous ion emitter (nano-PIE) and the analyte on a filament to create a loaded filament, wherein the nano-PIE is a hierarchical material, a modified hierarchical material, or a combination thereof.

2. The method of claim 1, wherein the nano-PIE comprises a single crystal, a polycrystalline material, a self-assembled monolayer, a modified nanoporous material, or any combination thereof.

3. The method of claim 1, wherein the nano-PIE comprises a metal or metalloid and a coordinating organic component.

4. The method of claim 3, wherein:
(i) the metal or metalloid comprises a transition metal, an alkali metal, a lanthanide, or any combination thereof; or
(ii) the coordinating organic component comprises an organic carboxylate, a heterocyclic ligand, or any combination thereof; or
(iii) both (i) and (ii).

5. The method of claim 1, wherein the nano-PIE comprises:
a coordination polymer (CP);
a modified CP, wherein the modified CP is obtained by combining a CP with a sorbent, combining a CP with a metal nanoparticle, thermal treatment, chemical treatment, or any combination thereof; or
any combination thereof.

6. The method of claim 5, wherein the CP is a metal organic framework (MOF), the modified CP is a modified MOF, or a combination thereof.

7. The method of claim 6, wherein the MOF or modified MOF comprises MOF-253; M-MOF-74 where M is Ni, Mg, Mn, Co, Zn, or any combination thereof; MIL-101; UiO-66; ZIF-67; or any combination thereof.

8. The method of claim 6, wherein the CP or modified CP has:
(i) an average pore diameter of from greater than 0 to 100 Å; or
(ii) a pore volume of from greater than 0 to 5 $cm^3/g$; or
(iii) a BET surface area of from greater than 0 to 8000 $m^2/g$; or
(iv) an average crystallite size of from greater than 0 to 500 μm; or
(v) any combination of (i)-(iv).

9. The method of claim 1, wherein:
(i) a mass ratio of the nano-PIE and the analyte is from $10^{15}$:1 to 10:1; or
(ii) a mass of the analyte is from 1 attogram to 1 microgram; or
(iii) both (i) and (ii).

10. The method of claim 1, wherein loading the nano-PIE on the filament comprises:
crystallizing the nano-PIE from a solution on the filament; or
coating the nano-PIE on the filament; or
printing the nano-PIE on the filament using 3D printing; or
depositing a suspension comprising the nano-PIE on the filament.

11. The method of claim 1, wherein the analyte comprises an actinide, a lanthanide, a platinum group element, Cs, or iodine.

12. The method of claim 1, further comprising preparing the loaded filament for analysis by TIMS by:
drying the nano-PIE and analyte on the loaded filament;
applying a vacuum to the loaded filament to provide a treatment pressure less than atmospheric pressure; and
applying a treatment current to the loaded filament under the treatment pressure for from 0 to 60 minutes to provide a treated filament.

13. The method of claim 12, wherein:
(i) the treatment pressure is from $3\times10^{-5}$ mbar to 0.1 mbar; or
(ii) the treatment current is from 0.1 A and 5 A applied at a rate of from 0.01 A/min to 0.1 A/min; or
(iii) both (i) and (ii).

14. The method of claim 12, further comprising providing a carbon-based or nitrogen-based atmosphere while applying the treatment current to the loaded filament under the treatment pressure.

15. The method of claim 12, further comprising conducting an analysis of the analyte by TIMS.

16. The method of claim 15, wherein an ionization efficiency of the analyte during the analysis is at least 1.1 times greater than an ionization efficiency of the analyte in the absence of the nano-PIE.

17. A method, comprising:
providing a loaded filament comprising a filament, a quantity of a nano-PIE disposed on the filament, and a quantity of an analyte disposed on the nano-PIE or within pores of the nano-PIE; and
conducting an analysis of the analyte by TIMS.

18. The method of claim 17, further comprising treating the loaded filament by applying a treatment current of from 0.1 A to 5 A applied at a rate of from 0.01 to 0.1 A/min under a treatment pressure less than atmospheric pressure before conducting the analysis.

* * * * *